US012571348B2

(12) United States Patent
Sheinberg et al.

(10) Patent No.:  US 12,571,348 B2
(45) Date of Patent:  Mar. 10, 2026

(54) FUEL LEAK COMBUSTION ASSEMBLY FOR IGNITING A GASEOUS FUEL LEAKING FROM A POTENTIAL LEAK LOCATION

(71) Applicant: General Electric Company, Schenectady, NY (US)

(72) Inventors: Dustin Sheinberg, Cambridge, MA (US); Steven Micha Szczap, West Chester, OH (US); Sean Christopher Binion, Loveland, OH (US); Kenneth R. Willett, Mukilteo, WA (US); Daniel Alan Niergarth, Norwood, OH (US); Jeffrey Donald Clements, Mason, OH (US); Christopher James Kroger, West Chester, OH (US); Jeffrey Douglas Rambo, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/621,810

(22) Filed: Mar. 29, 2024

(65) Prior Publication Data

US 2025/0305458 A1      Oct. 2, 2025

(51) Int. Cl.
| | |
|---|---|
| *F02C 7/25* | (2006.01) |
| *F02C 3/20* | (2006.01) |
| *F02C 7/22* | (2006.01) |
| *F02C 9/26* | (2006.01) |
(Continued)

(52) U.S. Cl.
CPC .................. *F02C 7/25* (2013.01); *F02C 3/20* (2013.01); *F02C 7/22* (2013.01); *F02C 9/263* (2013.01); *F02C 9/28* (2013.01); *F02C 9/46* (2013.01)

(58) Field of Classification Search
CPC .... F02C 7/22; F02C 7/25; F02C 9/263; F02C 9/28; F02C 9/46; F02C 3/20; F02C 3/22; B64D 37/30; B64D 37/32; B64D 2045/0085; B64D 2045/009; G01M 3/00; G01M 3/025; G01M 3/04; G01M 3/16;
(Continued)

(56) References Cited

U.S. PATENT DOCUMENTS

| | | | |
|---|---|---|---|
| 2,757,362 A | 7/1956 | Gutkowski |
| 2,835,109 A | 5/1958 | Longwell |
| 3,203,651 A | 8/1965 | Garrett |
(Continued)

FOREIGN PATENT DOCUMENTS

| | | | |
|---|---|---|---|
| FR | 3127257 A1 | 3/2023 | |
| GB | 800222 A | 8/1958 | |
| RU | 2789768 C1 * | 2/2023 | |

*Primary Examiner* — William H Rodriguez
(74) *Attorney, Agent, or Firm* — Carter, DeLuca & Farrell LLP

(57) ABSTRACT

An aeronautical vehicle comprising: a vehicle body; a propulsion system operable with the vehicle body, the propulsion system comprising a gas turbine engine, the gas turbine engine comprising a combustion section; a fuel delivery assembly comprising a gaseous fuel delivery section extending to the combustion section, the gaseous fuel delivery section defining a potential leak location; and a fuel leak combustion assembly comprising a heat source positioned in communication with potential leak location to ignite a gaseous fuel leaking from the potential leak location of the gaseous fuel delivery section of the fuel delivery assembly.

20 Claims, 10 Drawing Sheets

(51) Int. Cl.
  *F02C 9/28*    (2006.01)
  *F02C 9/46*    (2006.01)

(58) Field of Classification Search
  CPC .......... G01M 3/18; G01M 3/183; G01M 3/40;
            G05B 23/00; B64F 5/60
  See application file for complete search history.

(56)       References Cited

U.S. PATENT DOCUMENTS

| | | | |
|---|---|---|---|
| 2007/0277528 A1* | 12/2007 | Homitz ................... | F23D 14/58 |
| | | | 60/737 |
| 2012/0048000 A1* | 3/2012 | Kirzhner ........... | F02M 37/0017 |
| | | | 73/40.5 R |
| 2012/0318366 A1 | 12/2012 | Henkel et al. | |
| 2014/0102179 A1* | 4/2014 | Ekanayake .............. | F02C 7/22 |
| | | | 73/40.5 R |
| 2016/0178471 A1* | 6/2016 | Blumrich ............. | G01M 3/025 |
| | | | 73/49.7 |
| 2020/0173366 A1* | 6/2020 | Akana ....................... | F02C 7/25 |
| 2020/0262578 A1* | 8/2020 | Viscotchi .............. | G01M 3/025 |
| 2022/0065736 A1* | 3/2022 | Ziminsky ............... | F02C 7/222 |
| 2022/0307428 A1* | 9/2022 | Sibbach ................... | F02C 3/22 |
| 2023/0016408 A1* | 1/2023 | Meshkin Fam ......... | F01D 17/02 |
| 2023/0077242 A1 | 3/2023 | Emerson et al. | |
| 2024/0310049 A1* | 9/2024 | Takahashi ................ | F02C 3/22 |
| 2025/0042568 A1* | 2/2025 | Calderón Gómez .. | B64D 41/00 |
| 2025/0100705 A1* | 3/2025 | Minas ................... | B64D 37/32 |

\* cited by examiner

FUEL LEAK COMBUSTION ASSEMBLY FOR IGNITING A GASEOUS FUEL LEAKING FROM A POTENTIAL LEAK LOCATION

FIELD

The present disclosure relates to a fuel leak combustion assembly for a fuel delivery assembly in an aeronautical vehicle.

BACKGROUND

A conventional commercial aircraft generally includes a fuselage, a pair of wings, and a propulsion system that provides thrust. The propulsion system typically includes one or more aircraft engines, such as turbofan jet engines. The aircraft engine(s) may be typically mounted to a respective one of the wings of the aircraft, such as in a suspended position beneath the wing.

The aircraft further includes a fuel delivery assembly that generally includes a fuel tank and one or more fuel lines that extend between the fuel tank and the aircraft engine(s). Traditional aircraft engines are powered by aviation turbine fuel, which is typically a combustible hydrocarbon liquid fuel, such as a Kerosene-type fuel, having a desired carbon number. The aviation turbine fuel is a relatively power-dense fuel that is relatively easy to transport and stays in a liquid phase through most ambient operating conditions for aircraft.

It has been argued that improvements in emissions from conventional aircraft having aircraft engines powered by aviation turbine fuel may be achieved by utilizing a hydrogen fuel. Hydrogen fuel is not a relatively power-dense fuel in its gaseous form and in liquid form has an extremely low boiling point.

The inventors of the present disclosure have found that these and other issues may make it difficult to use hydrogen fuel for aircraft engines. Accordingly, technological improvements facilitating use of hydrogen fuel in aircraft engines in view of these and other issues would be welcomed.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
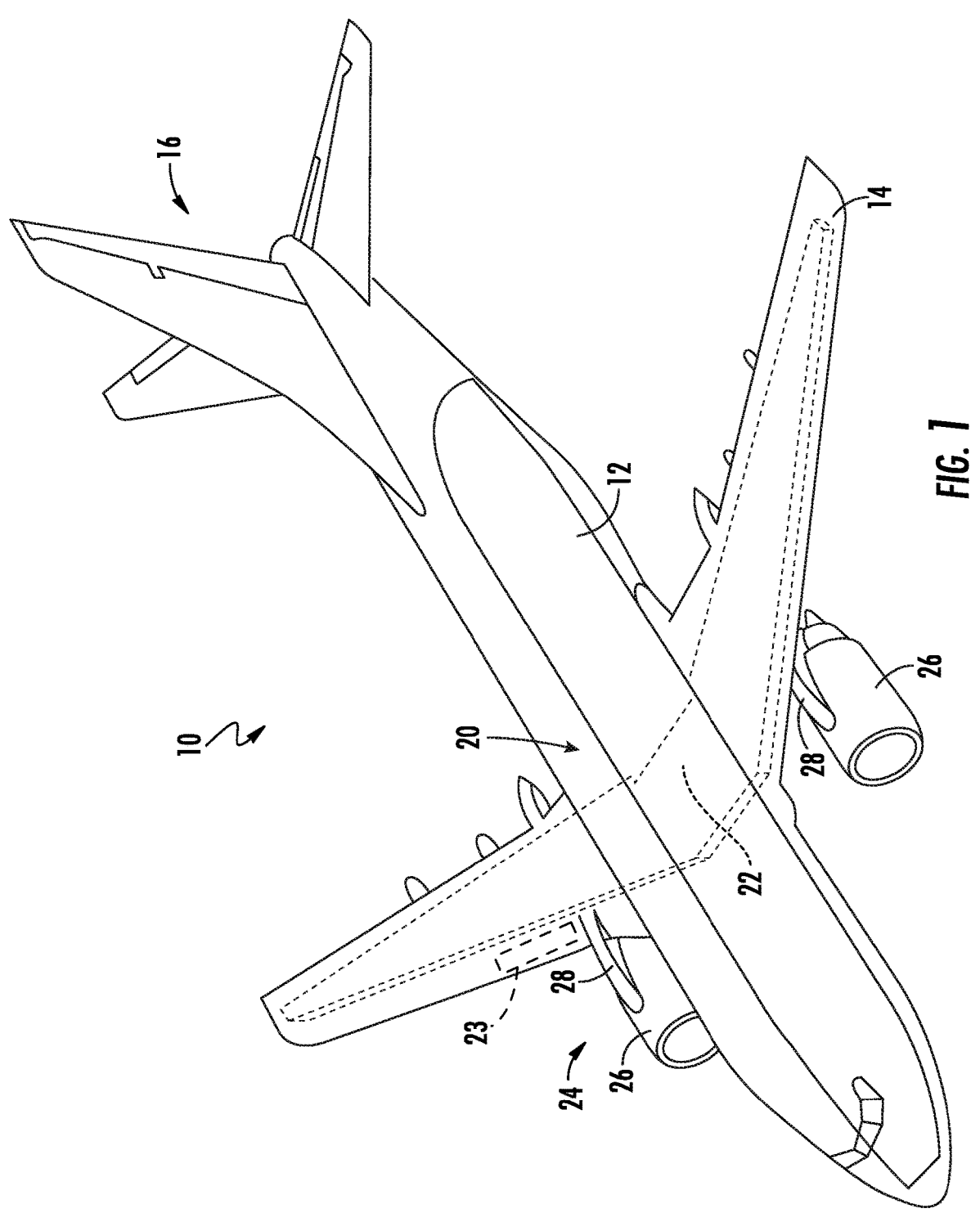
FIG. 1 is a schematic view of an aircraft having a fuel system in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

Utilization of a cryogenic fuel, and in particular hydrogen fuel, to power a propulsion system of an aeronautical vehicle may provide many benefits. While it may be stored in a liquid state, hydrogen fuel must be converted to a gaseous state before being combusted. Transportation of the hydrogen fuel in the gaseous state, however, may be difficult as hydrogen gas is relatively small and can leak through certain materials and structures (e.g., joints in a fuel delivery system).

While a goal of fuel delivery systems transporting hydrogen fuel in the gaseous state is to minimize any fuel leaks, the inventors of the present disclosure have found that relatively minor leaks may be controlled through use of a fuel leak combustion assembly in accordance with one or more of the exemplary embodiments of the present disclosure. The fuel leak combustion assembly includes a heat source positioned in communication with a potential leak location of a gaseous fuel delivery section of the fuel delivery assembly. The heat source of the fuel leak combustion assembly is configured to ignite a gaseous fuel leaking from the potential leak location of the gaseous fuel delivery section of the fuel delivery assembly. In such a manner, the fuel leak combustion assembly may control relatively small/minor leaks by combusting the hydrogen gas presented. Such combustion of hydrogen gas presented in a leak may lead to a relatively small/minor combustion event, with correspondingly small/minor pressure and temperature rises that may be absorbed without causing damage to the components of the vehicle or gas turbine engine. In particular, such a configuration may replace a high energy event associated with a fuel leak that may damage the vehicle or gas turbine engine with a more manageable low energy event.

Referring now to FIG. 1, a perspective view of a vehicle of the present disclosure is provided. Specifically, for the exemplary embodiment of FIG. 1, the vehicle is configured as an aeronautical vehicle, or aircraft 10. The exemplary aircraft 10 has a vehicle body, and more specifically has a fuselage 12, wings 14 attached to the fuselage 12, and an empennage 16.

The exemplary aircraft 10 further includes a fuel system 20 having a fuel tank. For the embodiment depicted, the fuel system 20 utilizes a cryogenic fuel, and more specifically a hydrogen fuel. Accordingly, the fuel tank is a liquid hydrogen fuel tank 22 for holding a hydrogen fuel in a liquid phase. In the exemplary aircraft 10 shown in FIG. 1, at least a portion of the liquid hydrogen fuel tank 22 is located in a wing 14 of the aircraft 10. In some embodiments, however, the liquid hydrogen fuel tank 22 may be located at other locations in the fuselage 12 or the wing 14. It will be appreciated that the hydrogen fuel is stored in the liquid hydrogen fuel tank 22 at a relatively low temperature. For example, the hydrogen fuel may be stored in the liquid hydrogen fuel tank 22 at about −253 degrees Celsius or less at an atmospheric pressure, or at other temperatures and pressures to maintain the hydrogen fuel substantially in the liquid phase. The liquid hydrogen fuel tank 22 may be made from materials such as titanium, Inconel, aluminum, or composite materials.

The aircraft 10 further includes a propulsion system 24 operable with the vehicle body that produces a propulsive thrust required to propel the aircraft 10 in flight, during taxiing operations, etc. Although the propulsion system 24 is shown attached to the wing(s) 14 in FIG. 1, in other embodiments it may additionally or alternatively include one or more aspects coupled to other parts of the aircraft 10, such as, for example, the empennage 16, the fuselage 12, or both.

For the exemplary aspect depicted, the propulsion system 24 includes an engine, and more specifically includes a pair of engines. More specifically, still, each of the engines in the pair of engines is configured as a gas turbine engine 26 mounted to one of the respective wings 14 of the aircraft 10 in an under-wing configuration through a respective pylon 28. Each gas turbine engine 26 is capable of selectively generating a propulsive thrust for the aircraft 10. The amount of propulsive thrust may be controlled at least in part based on a volume (or, more specifically, a mass flowrate) of fuel provided to the gas turbine engines 26 via the fuel system 20.

Briefly, it will be appreciated that the aircraft 10 may include one or more compartments 23 in the wings 14 or elsewhere, through which at least a portion of a fuel delivery system of the fuel system 20 in fluid communication with the liquid hydrogen fuel tank 22 extends.

Notably, the embodiment depicted in FIG. 1 is by way of example only. In other exemplary embodiments, any other suitable aircraft 10 may be provided, and may include one or more engines 26 mounted to the wings, mounted to the fuselage, integrated into the fuselage, mounted to or integrated into a stabilizer, etc.

Figure 2:
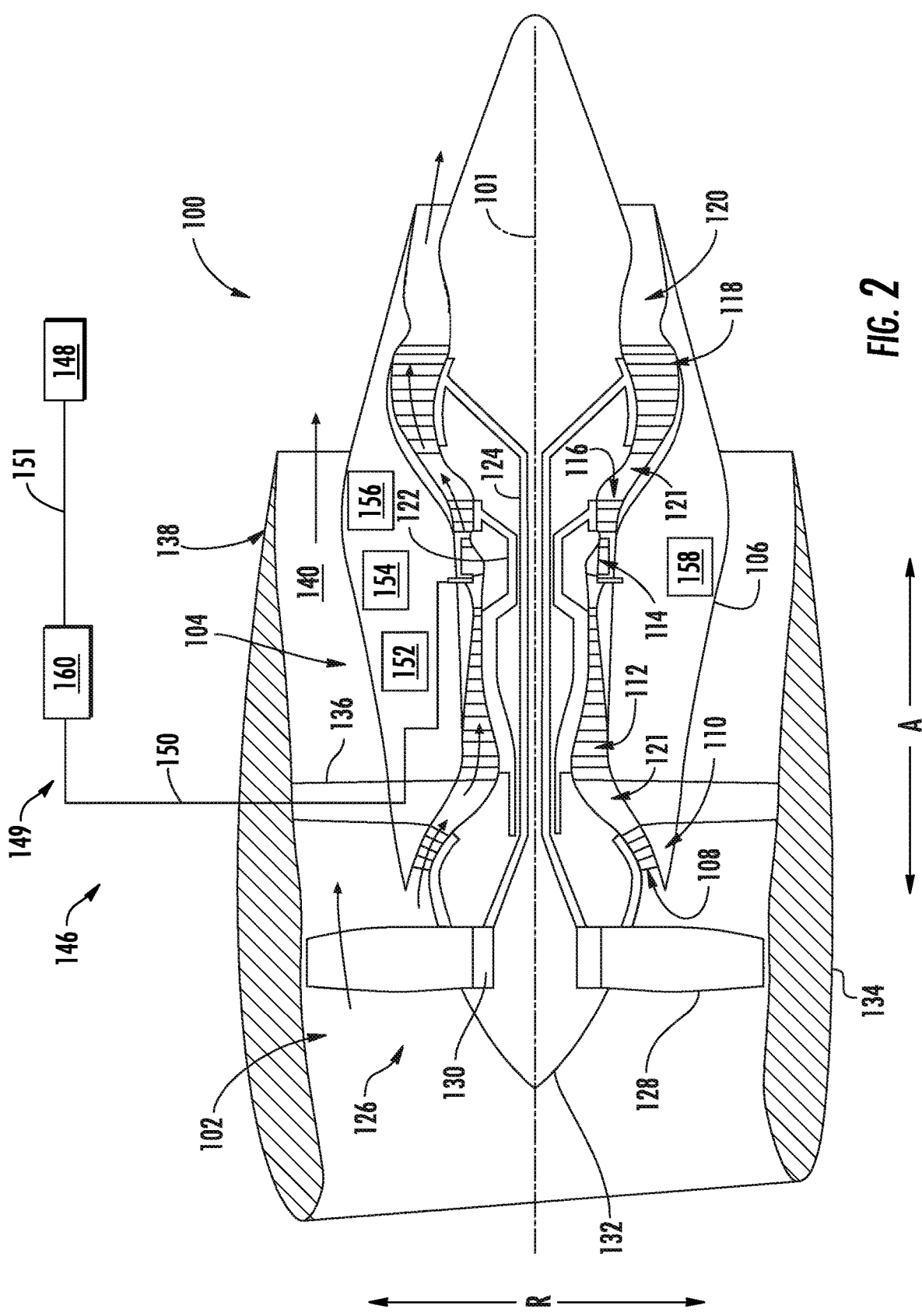
FIG. 2 is a schematic, cross-sectional view of a gas turbine engine in accordance with an exemplary embodiment of the present disclosure.

Referring now to FIG. 2, a schematic, cross-sectional view of a gas turbine engine in accordance with an exemplary embodiment of the present disclosure is provided. For example, the exemplary gas turbine engine of FIG. 2 may be incorporated into propulsion system 24 described above with reference to FIG. 1 as one of the gas turbine engines 26.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 2). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine 100 further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted in FIG. 2, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 2, the turbofan engine 100 is operable with a fuel system 146 for receiving a flow of fuel from the fuel system 146. The fuel system 146 may be configured similarly to the fuel system 20 of FIG. 1. Accordingly, the fuel system 146 generally includes a fuel tank 148, a fuel delivery assembly 149, and a heating assembly 160. The fuel delivery assembly 149 may provide a fuel flow from the fuel tank 148 to the combustion section 114 of the engine 100, and more specifically to a fuel manifold (not labeled) of the combustion section 114 of the turbomachine 104 of the turbofan engine 100.

As will be appreciated, the turbofan engine 100 may utilize a cryogenic fuel, such as a hydrogen fuel stored in a liquid phase. However, in order for the combustion section 114 of the turbofan engine 100 to efficiently combust the hydrogen fuel, the hydrogen fuel must be heated from the liquid phase to a gaseous phase. The heating assembly 160 is configured to heat the hydrogen fuel from the liquid phase to the gaseous phase. In such a manner, it will be appreciated that the fuel delivery assembly 149 generally includes a liquid fuel delivery section 151 extending from the fuel tank 148 and a gaseous fuel delivery section 150 extending to the combustion section 114.

Moreover, as is depicted schematically in FIG. 2, the exemplary turbofan engine 100 further includes various accessory systems to aid in the operation of the turbofan engine 100 and/or an aircraft including the turbofan engine 100. For example, the exemplary turbofan engine 100 further includes a main lubrication system 152 configured to provide a lubricant to, e.g., various bearings and gear meshes in the compressor section, the turbine section, the HP spool 122, the LP spool 124, etc. The lubricant provided by the main lubrication system 152 may increase the useful life of such components and may remove a certain amount of heat from such components. Additionally, the turbofan engine 100 includes a compressor cooling air (CCA) system 154 for providing air from one or both of the HP compressor 112 or LP compressor 110 to one or both of the HP turbine 116 or LP turbine 118. Moreover, the exemplary turbofan engine 100 includes an active thermal clearance control (ACC) system 156 for cooling a casing of the turbine section to maintain a clearance between the various turbine rotor blades and the turbine casing within a desired range throughout various engine operating conditions. Furthermore, the exemplary turbofan engine 100 includes a generator lubrication system 158 for providing lubrication to an electronic generator (not shown), as well as cooling/heat removal for the electronic generator. The electronic generator may provide electrical power to, e.g., a startup electric motor for the turbofan engine 100 and/or various other electronic components of the turbofan engine 100 and/or an aircraft including the turbofan engine 100.

Heat from these accessory systems 152, 154, 156, 158, and other accessory systems may be provided to various heat sinks as waste heat from the turbofan engine 100 during operation (e.g., to the heating assembly 160 of the fuel system 146).

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158 discussed above.

Figure 3:
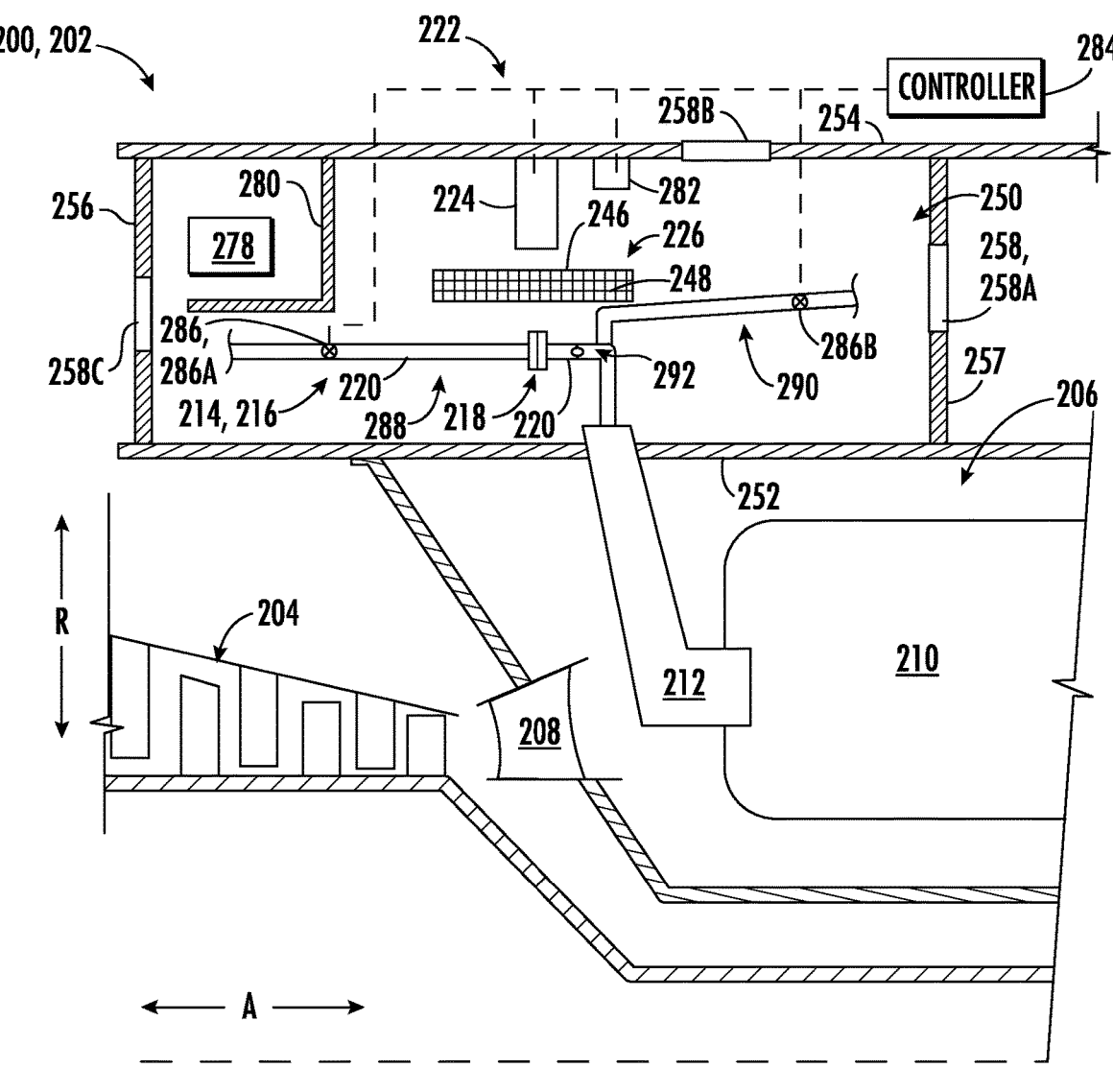
FIG. 3 is a schematic view of a section of a gas turbine engine having a fuel leak combustion assembly in accordance with an exemplary embodiment of the present disclosure.

Referring now to FIG. 3, a schematic view of a section of an aeronautical vehicle in accordance with an exemplary embodiment of the present disclosure is provided. In particular, FIG. 3 provides a schematic view of a section of a gas turbine engine 200 of an aeronautical vehicle in accordance with an exemplary embodiment of the present disclosure. The exemplary gas turbine engine 200 of FIG. 3 may be configured in a similar manner as one or more of the exemplary gas turbine engines discussed hereinabove (e.g., gas turbine engines 26 of FIG. 1; turbofan engine 100 of FIG. 2) and incorporated into any suitable aeronautical vehicle (e.g., aircraft 10 of FIG. 1, or any other suitable aircraft). Accordingly, the same or similar numbers may refer to the same or similar parts.

The exemplary gas turbine engine 200 depicted generally includes a turbomachine 202 having a compressor section (including an HP compressor 204, a combustion section 206, and a turbine section (not shown). Turbine machine defines a working gas flowpath through the compressor section (and HP compressor 204), combustion section 206, and turbine section (not shown). The combustion section 206 generally includes an airflow diffuser nozzle 208, a combustion chamber 210, and a plurality of fuel nozzles/mixers 212 (configured to receive pressurized airflow from the HP compressor 204, mix it with fuel, and provide to the combustion chamber 210).

The exemplary gas turbine engine 200 further includes a fuel delivery assembly 214 operable with a cryogenic fuel. For example, in the embodiment depicted the fuel delivery assembly 214 is operable with a hydrogen fuel stored in a liquid phase. The hydrogen fuel may be stored in the liquid phase in a liquid hydrogen fuel tank (see liquid hydrogen fuel tank 22 of FIG. 1; fuel tank 148 of FIG. 2). The fuel delivery assembly 214 is configured to transport the hydrogen fuel in the liquid phase to a heating assembly (see heating assembly 160 of FIG. 2), where the hydrogen fuel is converted to a gaseous phase. The fuel delivery assembly 214 includes a gaseous fuel delivery section 216 extending to the combustion section 206 of the gas turbine engine 200 to deliver gaseous hydrogen fuel to the combustion section 206 of the gas turbine engine 200.

Given the physical properties of gaseous hydrogen fuel, a potential for the gaseous hydrogen fuel to leak from the gaseous fuel delivery section 216 of the fuel delivery assembly 214 may be relatively high as compared to traditional jet fuel. For example, the gaseous fuel delivery section 216 may define a potential leak location 218 where the gaseous hydrogen fuel may be likely to leak out of the gaseous fuel delivery section 216 of the fuel delivery assembly 214. In the exemplary embodiment depicted, the potential leak location 218 is a joint of the gaseous fuel delivery section 216 between two adjacent conduits 220 of the gaseous fuel delivery section 216.

Other exemplary potential leak locations 218 may include, e.g., high pressure points within the gaseous fuel delivery section 216, portions of the gaseous fuel delivery section 216 exposed to mechanical wear or harsh environments, etc.

In order to address potential gaseous hydrogen fuel leaks from the potential leak location 218, the exemplary aeronautical vehicle depicted, and more specifically the gas turbine engine 200 depicted, includes a fuel leak combustion assembly 222. The fuel leak combustion assembly 222 includes a heat source 224 positioned in communication with the potential leak location 218 to ignite a gaseous fuel leaking from the potential leak location 218 of the gaseous fuel delivery section 216 of the fuel delivery assembly 214.

In particular, it will be appreciated that the aeronautical vehicle, and, more specifically, the fuel delivery assembly 214, defines a diffusion zone 226 surrounding the potential leak location 218, and the heat source 224 is positioned in communication with the potential leak location 218 by being positioned within the diffusion zone 226.

As used herein, the term "diffusion zone" refers to an area surrounding the potential leak location 218 expected to contain a concentration of gaseous fuel sufficient for ignition of the gaseous fuel (e.g., between 4% and 77% bulk concentration for gaseous hydrogen) during a non-rupture leak event through the potential leak location 218, or within five minutes of the non-rupture leak event. The non-rupture leak event refers to any leak event where the parts forming the gaseous fuel delivery section 216 at the potential leak location 218 do not fracture, rupture, break, or the like.

In such a manner, it will be appreciated that the heat source 224 of the fuel leak combustion assembly 222 may be any source of heat capable of initiating gaseous hydrogen fuel laden air surrounding the potential leak location 218 at the concentrations noted for the diffusion zone 226.

Figure 4:
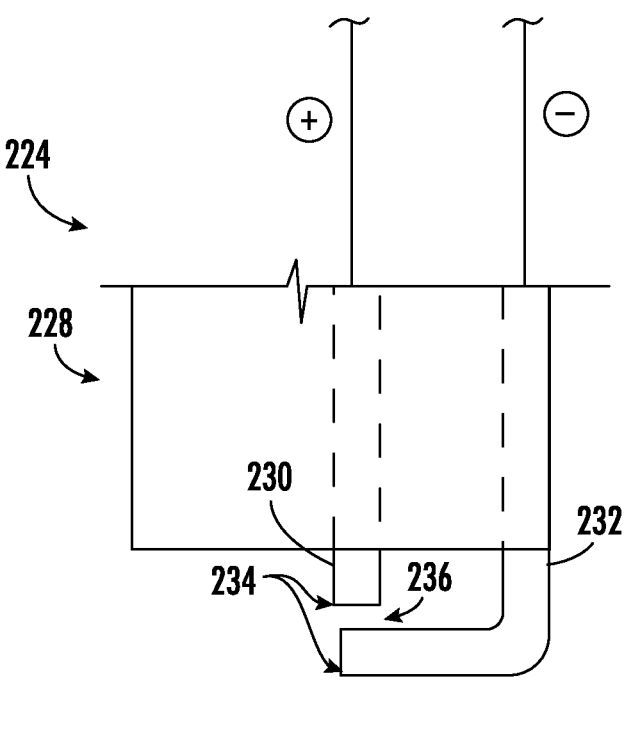
FIG. 4 is a heat source for a fuel leak combustion assembly in accordance with an exemplary embodiment of the present disclosure.

For example, referring briefly to FIG. 4, providing a schematic view of a heat source 224 in accordance with an exemplary embodiment of the present disclosure, in certain exemplary embodiments, the heat source 224 may be a spark generating device 228, such as a spark plug. As we appreciated, the spark generating device 228 of FIG. 4 generally includes a first electrode 230 coupled to a positive electrical power source and a second electrode 232 coupled to a negative electrical power source. Distal ends 234 of the first electrode 230 and the second electrode 232 define a spark gap 236, such that when the positive and negative electrical power sources are activated, one or more sparks are generated between the distal ends 234 of the first electrode 230 and the second electrode 232, within the spark gap 236.

Figure 5:
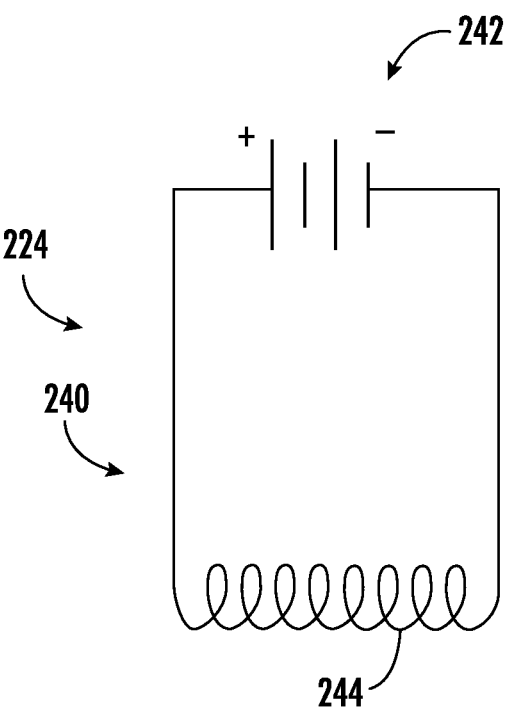
FIG. 5 is a heat source for a fuel leak combustion assembly in accordance with another exemplary embodiment of the present disclosure.

Alternatively, referring now briefly to FIG. 5, providing a schematic view of a heat source 224 in accordance with another exemplary embodiment present disclosure, it will be appreciated that in other embodiments, the heat source 224 may be an electric resistance heat source 238. In particular, for the embodiment of FIG. 5, the electric resistance heat source 238 is a hot wire 240 formed of a wire coupled to an electric power source 242 with a coil 244 providing electrical resistance which, when activated, heats to a temperature in excess of an autoignition for gases hydrogen fuel laden air surrounding the potential leak location 218 at the concentrations noted for the diffusion zone 226.

Alternatively, still, in other exemplary embodiments, the heat source 224 may be any other heat source 224 capable of initiating gases hydrogen fuel laden air surrounding the potential leak location 218 at the concentrations noted for the diffusion zone 226. For example, in other exemplary embodiments, the heat source 224 may include a burner, mechanical spark generating device, a hotplate, or combinations of one or more of the exemplary heat sources 224 disclosed herein.

Referring now back to FIG. 3, as noted above, the heat source 224 is configured to ignite gaseous fuel leaking from the potential leak location 218 of the gaseous fuel delivery section 216. In the exemplary embodiment of FIG. 3, the fuel leak combustion assembly 222 additionally includes a flame arrestor 246 positioned around the potential leak location 218. In particular, for the embodiment depicted, the exemplary flame arrestor 246 is positioned between the potential leak location 218 and the heat source 224.

The flame arrestor 246 is configured to limit a spread of fire from the potential leak location 218 following the ignition of the gaseous fuel laden air around the potential leak location 218. In particular, the flame arrestor 246 is a safety device designed to prevent the propagation of flame or explosion from the area surrounding the potential leak location 218 to another while allowing the passage of gas. The flame arrestor 246 includes a mesh 248 that absorbs and dissipates heat from a flame front, thereby quenching the flame and preventing its spread through the engine system. Additionally, or alternatively, the flame arrestor 246 may include a perforated metal structure or other structures to accomplish the same.

Figure 6:
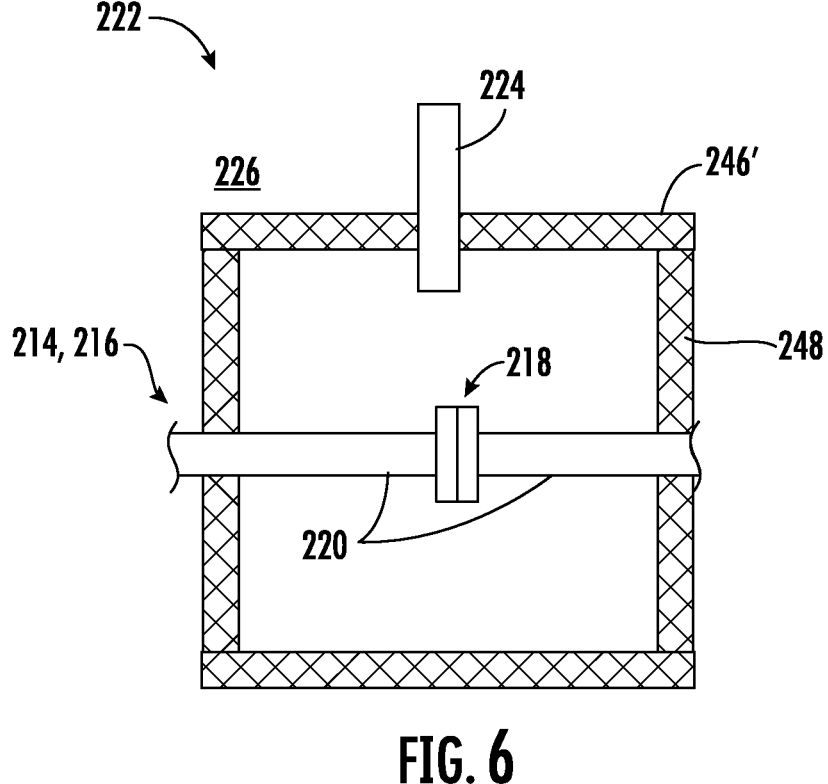
FIG. 6 is a flame arrestor for a fuel leak combustion assembly in accordance with an exemplary embodiment of the present disclosure.
Figure 7:
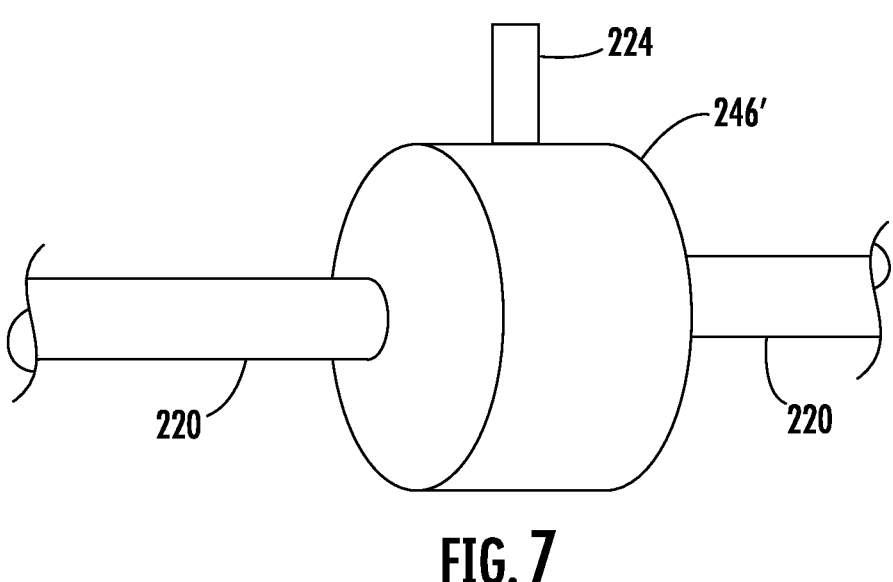
FIG. 7 is a perspective view of the exemplary flame arrestor of FIG. 6.

It will be appreciated, however, that while the exemplary flame arrestor 246 is positioned between the heat source 224 and the potential leak location 218 in the exemplary embodiment of FIG. 3, in other exemplary embodiments, the flame arrestor 246 may have other configurations. For example, referring now to FIGS. 6 and 7, a flame arrestor 246' of a fuel leak combustion assembly 222 operable with a fuel delivery assembly 214 in accordance with another exemplary embodiment of the present disclosure is provided. In the exemplary embodiment of FIGS. 6 and 7, the flame arrestor 246' of the fuel leak combustion assembly 222 encloses the potential leak location 218. In particular, the flame arrestor 246' of the fuel leak combustion assembly 222 depicted in FIGS. 6 and 7 extends around the potential leak location 218 (e.g., at least 300 degrees around the potential leak location 218, such as at least 330 degrees around the potential leak location 218, such as completely around the potential leak location 218; see FIG. 7) to encircle the potential leak location 218, and further includes sections encircling the conduits 220.

Further, for the embodiment depicted, the heat source 224 is positioned at partially between the flame arrestor 246' and the potential leak location 218. Specifically, for the embodiment of FIGS. 6 and 7, the heat source 224 extends through the flame arrestor 246'. In such a manner, the heat source 224 may ignite gaseous hydrogen fuel laden air around the potential leak location 218 at a location that may be contained by the flame arrestor 246'.

Notably, in still other exemplary embodiments, the flame arrestor 246' may have other shapes and arrangements to limit the spread of fire from the potential leak location 218 upon ignition by the heat source 224.

Referring again back to FIG. 3, it will be appreciated that the aeronautical vehicle further includes a compartment 250. In particular, for the embodiment of FIG. 3 the compartment 250 is part of the gas turbine engine 200. More specifically, the turbomachine 202 of the exemplary gas turbine engine 200 depicted in FIG. 3 includes a first casing 252 and a separate second casing 254 spaced from one another along the radial direction R, and a third casing 256 and a fourth casing 257 spaced from one another along the axial direction A. The first casing 252 losing casing, the third casing 256, and the fourth casing 257 together define at least in part the compartment 250.

Notably, for the embodiment depicted, the first casing 252 is an outer combustor casing surrounding, at least in part, the combustion section 206, and the second casing 254 is an outer cowl of the turbomachine 202 (see outer casing 106 of FIG. 2). The third casing 256 and the fourth casing 257 are each configured as walls extending between the first and second casings 252, 254 (the outer combustor casing and the outer cowl for the embodiment depicted).

The compartment 250 is configured to contain the ignition of any gaseous hydrogen fuel leak from the potential leak location 218 during operation of the fuel leak combustion assembly 222. In such a manner, it will be appreciated that the heat source 224 of the fuel leak combustion assembly 222 and the potential leak location 218 of the gaseous fuel delivery section 216 are each located in the compartment 250. Moreover, in the embodiment depicted, the compartment 250 completely contains the diffusion zone 226 defined by the fuel delivery assembly 214 for the potential leak location 218 (and the diffusion zone 226 extends throughout the compartment 250).

During an ignition of gaseous hydrogen fuel from the potential leak location 218, a pressure within the compartment 250 may rise quickly as a result of the ignition, and in particular, a high pressure wave may emanate from the ignition location. While the pressure rise may be less than if the leak were left unaffected for an extended period of time and then ignited unintentionally, the pressure rise may nonetheless be greater than the structural components forming the compartment 250 is designed to withstand. Accordingly, in order to avoid a potential failure of the structural components forming the compartment 250, the compartment 250 includes a pressure relief assembly, which for the embodiment shown is a blow-out door 258. In particular, for the embodiment of FIG. 3, the blow-out door 258 is a first blow-out door 258A, and the compartment 250 further includes a second blow-out door 258B and a third blow-out door 258C. The first blow-out door 258A and third blow-out door 258C may lead to other under cowl compartments of the gas turbine engine 200 (i.e., compartment 250s located inward of the outer cowl of the turbomachine 202 along the radial direction R). The second blow-out door 258B is positioned within the outer cowl of the turbomachine 202, and, thus, may lead to a bypass passage of the gas turbine engine 200 (see, e.g., bypass passage 140 in FIG. 2).

Figure 8:
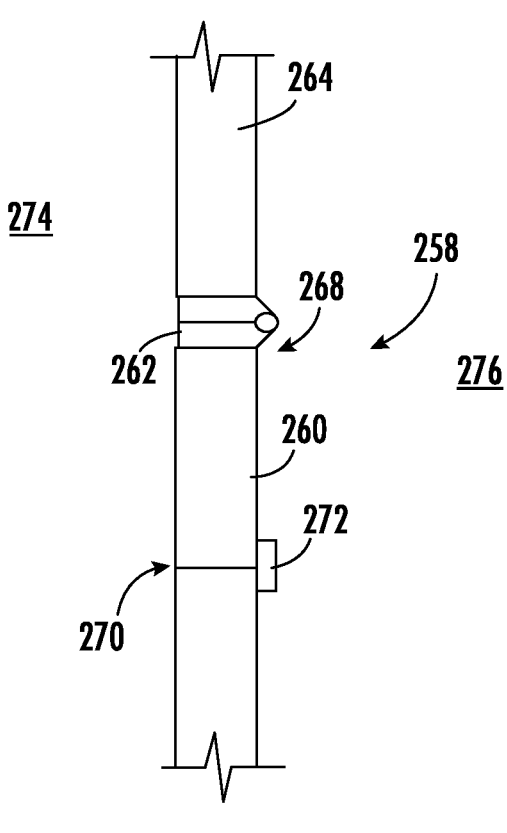
FIG. 8 is a view of a blow-out door in accordance with an exemplary embodiment of the present disclosure in a closed position.
Figure 9:
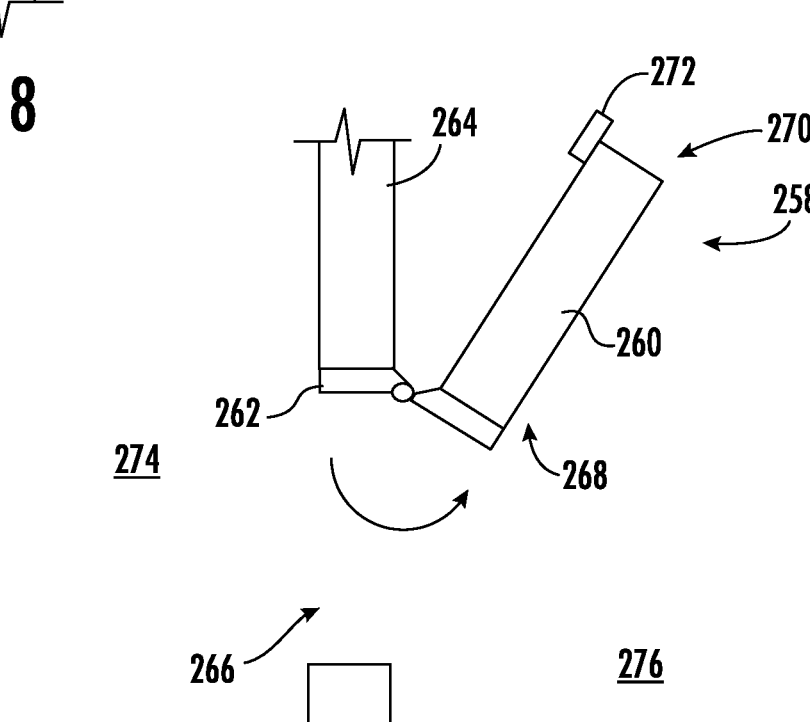
FIG. 9 is a view of the exemplary blow-out door of FIG. 8 in an open position.
Figure 9:
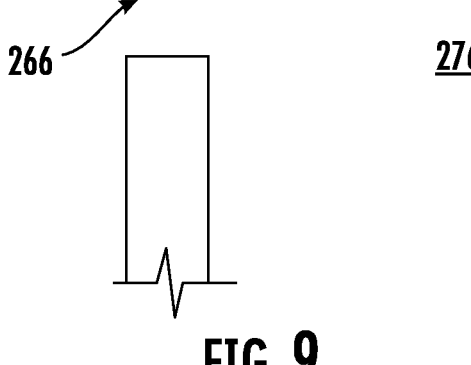

Referring now briefly to FIGS. 8 and 9, operation of a blow-out door 258 in accordance with an exemplary embodiment of the present disclosure is provided. The exemplary blow-out door 258 of FIGS. 8 and 9 may be incorporated into the compartment 250 of FIG. 3 as the first blow-out door 258A, the second blow-out door 258B, the third blow-out door 258C, or combinations thereof.

The exemplary blow-out door 258 of FIGS. 8 and 9 generally includes a panel 260 and a hinge 262. The panel 260 is coupled to a casing 264 through the hinge 262, such that the panel 260 may pivot relative to the casing 264 between a closed position (FIG. 8) wherein the panel 260 covers an opening 266 in the casing 264 (see FIG. 9 for opening 266), and an open position (FIG. 9) wherein the panel 260 pivots away from the opening 266 to expose the opening 266.

In particular, the panel 260 includes a first end 268 and an opposite second end 270, and the first end 268 is coupled to the casing 264 through the hinge 262. The blow-out door 258 further includes a latch 272 coupled to the panel 260, the casing 264, or both. In the embodiment depicted, the latch 272 is coupled to the second end 270 of the panel 260 to hold the panel 260 against the casing 264.

When a pressure on a first side 274 of the casing 264 is sufficiently higher than a pressure on an opposite, second side 276 of the casing 264, the latch 272 may allow the panel 260 to pivot from the closed position (FIG. 8) to the open position (FIG. 9), allowing for a flow of gas from the first side 274 of the casing 264 to the second side 276 of the casing 264. In such a manner, in the event of an ignition of gaseous hydrogen fuel on the first side 274 of the casing 264, an increase in pressure on the first side 274 of the casing 264 may cause the panel 260 of the blow-out door 258 to move to the open position to allow for combustion gases or other gas from the first side 274 of the casing 264 to be released to the second side 276 of the casing 264.

Referring again back to FIG. 3, it will be appreciated that although the fuel leak combustion assembly 222 depicted includes blow-out doors 258 as the pressure relief assembly, in other embodiments, other pressure relief assemblies may be included (e.g., burst ducts). For example, in other embodiments, the pressure relief assembly may include one or more diffusers, a plurality of small openings or other structures (e.g., to allow for airflow, while reducing a pressure wave emanating from ignition of gaseous hydrogen fuel leaking from the potential leak location 218), etc.

It will further be appreciated that not all components or systems within the diffusion zone 226, within the compartment 250, or both may be designed for exposure to the ignition of gaseous hydrogen fuel leaking from the potential leak location 218 of the gaseous fuel delivery section 216. For example, in the embodiment of FIG. 3, the gas turbine engine 200 further includes a gas turbine engine system 278 positioned at least partially within the compartment 250 (which may be one or more of the systems 152, 154, 156, 158 described above with reference to FIG. 2). In order to reduce a likelihood of the gas turbine engine system 278 being damaged in the event of an ignition of gaseous hydrogen fuel by the fuel leak combustion assembly 222, the aeronautical vehicle further includes, and more specifically, the gas turbine engine 200 further includes, a shield 280 positioned within the compartment 250 between the potential leak location 218 and the gas turbine engine system 278. The shield 280 may be coupled directly to the gas turbine engine system 278, or alternatively, as in the embodiment depicted, may be coupled to a structure forming the compartment 250 and may extend over, around, or otherwise between the gas turbine engine system 278 and the potential leak location 218. The shield 280 may absorb heat from the ignition of gaseous fuel from the potential leak location 218, may absorb a pressure wave from the ignition of the gaseous fuel from the potential leak location 218, or both.

Notably, for the exemplary embodiment depicted, the shield 280 is a nonstructural component for the gas turbine engine 200. In such a manner, it will be appreciated that the shield 280 is not designed to carry structural loads during normal operations of the gas turbine engine 200. The shield 280 may be formed of a metal material, a composite material, etc.

Moreover, it will be appreciated that the fuel leak combustion assembly 222 of FIG. 3 may be operated such that the heat source 224 is continually active, i.e., continually capable of igniting gaseous hydrogen fuel, during operation of the gas turbine engine 200.

Alternatively, as in the exemplary embodiment depicted, the fuel leak combustion assembly 222 may be operated selectively. In particular, the exemplary fuel leak combustion assembly 222 depicted includes a fuel sensor 282 configured to sense data indicative of gaseous fuel leaking the potential leak location 218. In certain exemplary embodiments, the fuel sensor 282 may be configured to sense data indicative of a temperature, data indicative of a pressure, or both. The fuel sensor 282 may be positioned within the diffusion zone 226, as in the embodiment of FIG. 3, or alternatively may be positioned at other locations where local temperatures, local pressures, or both are expected to change in response to gaseous fuel leaking from the potential leak location 218.

Further, for the embodiment of FIG. 3, the fuel leak combustion assembly 222 further includes a controller 284 in operable communication with the fuel sensor 282 and the heat source 224. The controller 284 may be a stand-alone controller 284 for the fuel leak combustion assembly 222, or alternatively may be integrated into one or more other controllers of the gas turbine engine 200 (e.g., a Full Authority Digital Engine Control (FADEC) controller), of the aeronautical vehicle, or both.

The controller 284 may obtain data indicative of gaseous fuel leaking from the potential leak location 218 sensed by the fuel sensor 282. In response to obtaining data indicative of the gaseous fuel leaking from the potential leak location 218, the controller 284 may activate the heat source 224 to ignite the gaseous fuel leaking from the potential leak location 218. In such a manner, the fuel leak combustion assembly 222 may operate only when needed to reduce potential negative effects of gaseous hydrogen leaks from the gaseous fuel delivery section 216 of the fuel delivery assembly 214.

In certain exemplary embodiments, the controller 284 may keep the heat source 224 active for an amount of time in response to obtaining data indicative of the gaseous fuel leaking from the potential leak location 218. The amount of time may be a predetermined amount of time, or it may be determined in response to the data received by the fuel sensor 282 (pre-activation of the heat source 224, post activation of the heat source 224, or both).

Moreover, the exemplary fuel leak combustion assembly 222 may be configured to take additional remedial actions in response to obtaining data indicative of the gaseous fuel leaking from the potential leak location 218. In particular, in response to obtaining data indicative of the gaseous fuel leaking from the potential leak location 218, the controller 284 may be configured to reduce a fuel flow through one or more sections of the fuel delivery assembly 214, such as through the gaseous fuel delivery section 216 of the fuel delivery assembly 214. For example, in certain exemplary embodiments, in response to obtaining data indicative of the gaseous fuel leaking from the potential leak location 218, the controller 284 may be configured to reduce the fuel flow through the gaseous fuel delivery section 216 at the potential leak location 218 by at least 50%, such as by at least 75%, such as by at least 85% (each calculated based on a mass flowrate of the fuel immediately prior to obtaining data indicative of the gaseous fuel leaking from the potential leak location 218). For example, in certain exemplary embodiments, in response to obtaining data indicative of the gaseous fuel leaking from the potential leak location 218, the controller 284 may be configured to shut off the fuel flow through the gaseous fuel delivery section 216 at the potential leak location 218.

Notably, in the embodiment depicted, the fuel delivery assembly 214 further includes a variable throughput valve 286 operable with the gaseous fuel delivery section 216 to control the fuel flow through the gaseous fuel delivery section 216 at the potential leak location 218. In such a manner, it will be appreciated that in response to obtaining data indicative of gaseous fuel leaking from the potential leak location 218, the controller 284 is configured to actuate the variable throughput valve 286 to reduce the fuel flow through the gaseous fuel delivery section 216 at the potential leak location 218.

Referring still to FIG. 3, however, it will be appreciated that the exemplary fuel delivery assembly 214 and fuel leak combustion assembly 222 includes additional structure and features to allow for additional gaseous hydrogen fuel flow to the combustion section 206 in the event that the controller 284 reduces the fuel flow through the gaseous fuel delivery section 216 at the potential leak location 218.

In particular, in the embodiment depicted, the gaseous fuel delivery section 216 includes a first section 288 in fluid communication with the combustion section 206 and a second section 290 in fluid communication with the combustion section 206. The potential leak location 218 is defined by the first section 288. Further, the variable throughput valve 286 noted above is more specifically a first variable throughput valve 286A operable with the first section 288 to control the fuel flow through the first section 288. The fuel delivery assembly 214 further includes a second variable throughput valve 286B operable with the second section 290 to control a fuel flow through the second section 290. The controller 284 is in operable communication with both the first variable throughput valve 286A and the second variable throughput valve 286B. Accordingly, in response to obtaining data indicative of gaseous fuel leaking from the potential leak location 218, the controller 284 may further be configured to actuate the second variable throughput valve 286 to increase the fuel flow through the second section 290 of the gaseous fuel delivery section 216 to offset the reduction in fuel flow through the first section 288 of the gaseous fuel delivery section 216. In such a manner, the combustion section 206 may continue to receive a flow of gaseous fuel in the event the gaseous fuel flow is reduced through the first section 288.

Briefly, it will be appreciated that the first section 288 further includes a one-way check valve 292 to ensure proper flow direction of the gaseous fuel through the gaseous fuel delivery section 216.

It will be appreciated, however, that in other exemplary embodiments, the fuel leak combustion assembly 222 may be configured in any other suitable manner. For example, referring now to FIG. 10, a fuel leak combustion assembly 222 in accordance with another exemplary embodiment of the present disclosure is provided. The exemplary fuel leak combustion assembly 222 of FIG. 10 may be configured in a similar manner as one or more of the exemplary fuel leak combustion assemblies 222 described above. Accordingly, the same or similar numbers may refer to the same or similar parts.

Figure 10:
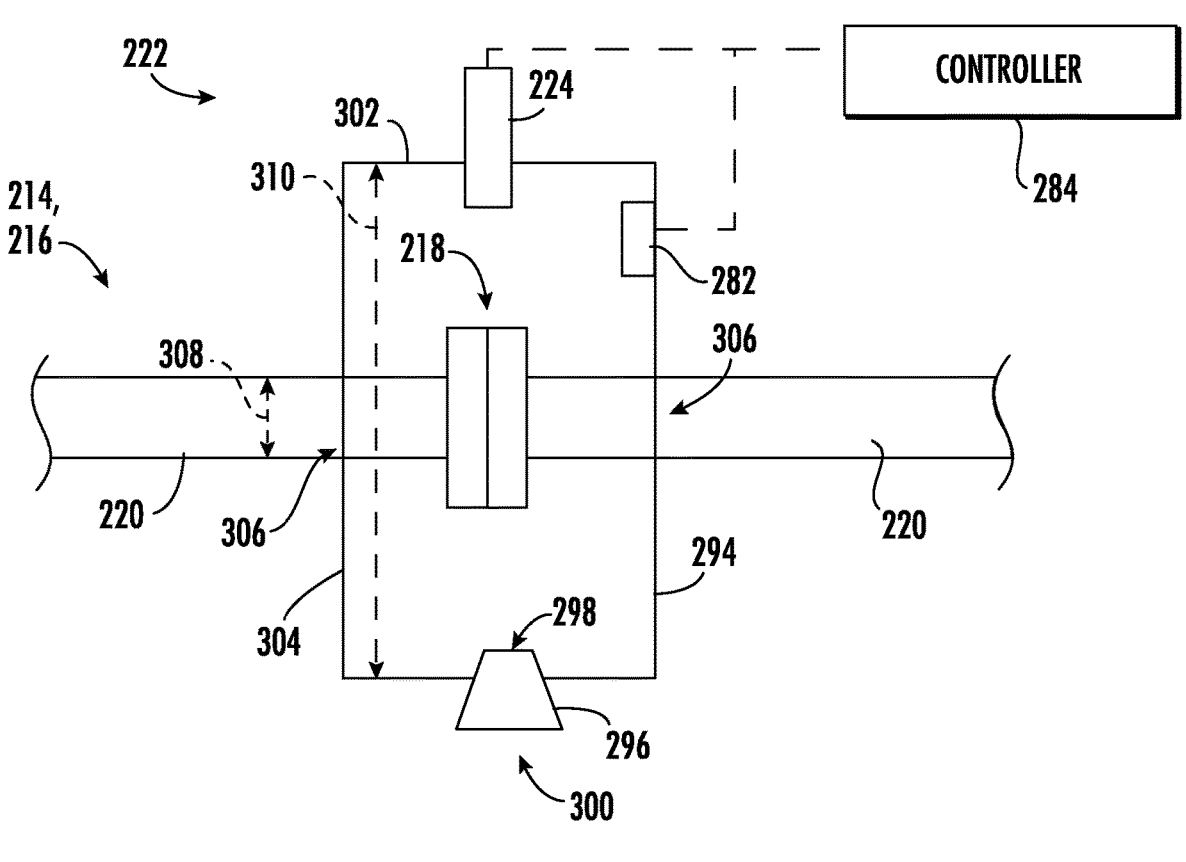
FIG. 10 is a schematic view of a fuel leak combustion assembly in accordance with another exemplary embodiment of the present disclosure.

For example, the exemplary fuel leak combustion assembly 222 of FIG. 10 is generally operable with a fuel delivery assembly 214 having a gaseous fuel delivery section 216 extending to a combustion section 206 (not shown). The gaseous fuel delivery section 216 defines a potential leak location 218. The fuel leak combustion assembly 222 includes a heat source 224 positioned in communication with the potential leak location 218 to ignite a gaseous fuel leaking from the potential leak location 218 of the gaseous fuel delivery section 216 of the fuel delivery assembly 214.

However, for the embodiment depicted, the fuel leak combustion assembly 222 further includes an enclosure 294 surrounding the potential leak location 218. For the embodiment shown, the heat source 224 extends through or is integrated with the enclosure 294. The enclosure 294 includes a diffuser 296 for directing airflow, including combustion gases, from within the enclosure 294 following an ignition of the gaseous fuel leaking from the potential leak location 218. The diffuser 296 is a portion of the enclosure 294 that defines an inlet 298 and an outlet 300 (the inlet 298 closer to an interior of the closure), with a cross-sectional area of the outlet 300 being greater than a cross-sectional area of the inlet 298. The diffuser 296 may reduce a pressure of airflow flowing therethrough, so as to minimize a pressure wave communicated to an environment surrounding the enclosure 294 following an ignition of gaseous hydrogen fuel leaking from the potential leak location 218.

Although the diffuser 296 is depicted in FIG. 10, it will be appreciated that in other exemplary embodiments, other structures may be provided. For example, in other embodiments, the enclosure 294 may include a blow-out door (see, e.g., the blow-out doors 258 of FIG. 3). Additionally, alternatively, in other embodiments, the enclosure 294 may include a plurality of small openings, or other structures to allow for airflow, while reducing a pressure wave emanating from the enclosure 294 following an ignition of gaseous hydrogen fuel leaking from the potential leak location 218.

Figure 11:
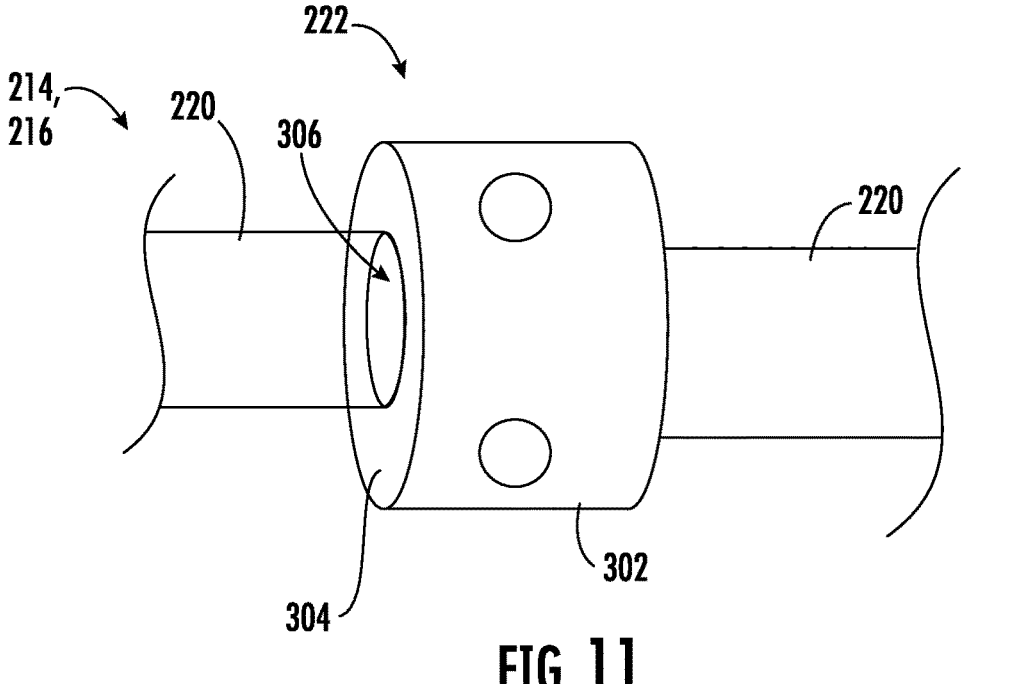
FIG. 11 is a perspective view of the exemplary fuel leak combustion assembly of FIG. 10.

Notably, for the embodiment depicted, the enclosure 294 is a local encapsulation of the potential leak location 218. In such a manner, the enclosure 294 extends completely around the potential leak location 218. For example, referring briefly also to FIG. 11, providing a perspective view of the enclosure 294 around the potential leak location 218, it will be appreciated that the enclosure 294 includes an outer wall 302 that extends substantially 360 degrees around the potential leak location 218 and a plurality of opposing end walls 304 that meet with the outer wall 302 and extend around conduits 220 on either side of the potential leak location 218.

In the embodiment depicted, the outer wall 302 defines a cylindrical shape. The end walls 304 define openings 306 for the conduits 220, with the openings 306 being substantially the same size as the respective conduit 220 (e.g., each opening 306 defining a maximum diameter no more than 10% higher than a maximum diameter of the respective conduit 220 of the gaseous fuel delivery section 216 at the location).

Referring particularly to FIG. 10, in at least certain exemplary embodiments, the enclosure 294 may be a relatively small enclosure 294 for the potential leak location 218. For example, in the embodiment depicted, the conduits 220 of the gaseous fuel delivery section 216 at the potential leak location 218 define a maximum diameter 308. Similarly, the enclosure 294 defines a maximum internal diameter 310 greater than the maximum diameter 308 of the conduits 220 and less than 1000% larger than the maximum diameter 308 of the conduits 220, such as less than 500% larger than the maximum diameter 308 of the conduits 220. Such a configuration may allow for a relatively compact enclosure 294, allowing for the enclosure 294 to be integrated at locations within, e.g., a gas turbine engine 200 that does not include substantial excess space.

As with the embodiment depicted, the fuel leak combustion assembly 222 further includes a fuel sensor 282 and a controller 284. The fuel sensor 282 is configured to sense data indicative of a temperature within the enclosure 294, a pressure within the enclosure 294, or both. The controller 284 is in operable communication with the fuel sensor 282 and the heat source 224, and may initiate an ignition of gaseous fuel leaking from the potential leak location 218 using the heat source 224 in response obtaining data (e.g., from the fuel sensor 282) indicative of gaseous fuel leaking from the potential leak source.

Moreover, in other exemplary embodiments, other configurations may be provided. For example, referring now to FIG. 12, a fuel leak combustion assembly 222 in accordance with another exemplary embodiment of the present disclosure is provided. The exemplary fuel leak assembly of FIG. 12 may be configured in a similar manner as exemplary fuel leak combustion assembly 222 described above with reference to FIGS. 10 and 11.

Figure 12:
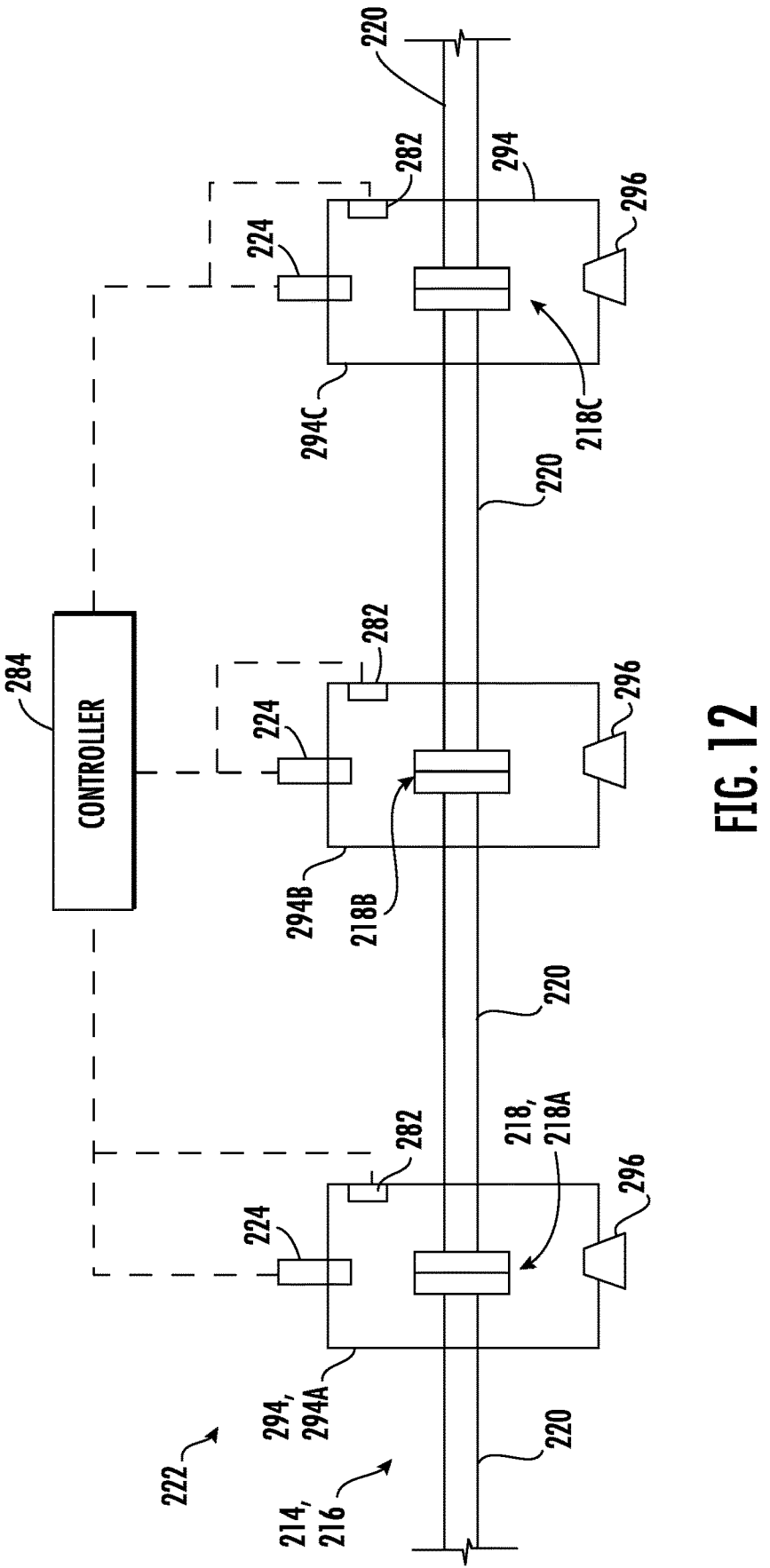
FIG. 12 is a schematic view of a fuel leak combustion assembly in accordance with yet another exemplary embodiment of the present disclosure.

For example, for the embodiment of FIG. 12, the fuel leak combustion assembly 222 is operable with a gaseous fuel delivery section 216 of a fuel delivery assembly 214. The gaseous fuel delivery assembly 214 defines a potential leak location 218. However, for the embodiment of FIG. 12, the potential leak location 218 is a first potential leak location 218A, and the gaseous fuel delivery section 216 further defines a plurality of potential leak locations 218. With such a configuration, the fuel leak combustion assembly 222 further includes a plurality of enclosures 294. Each enclosure 294 surrounds a respective one of the plurality of leak locations.

In particular, in the embodiment shown, the gaseous fuel delivery section 216 defines, in addition to the first potential leak location 218A, a second potential leak location 218B, and a third potential leak location 218C. The fuel leak combustion assembly 222 further includes a first enclosure 294A surrounding the first potential leak location 218A, a second enclosure 294B surrounding the second potential leak location 218B, and a third enclosure 294C surrounding the third potential leak location 218C. Each of the plurality of enclosures 294 (i.e., the first enclosure 294A, the second enclosure 294B, and the third enclosure 294C) may be configured in substantially the same manner as the exemplary enclosure 294 described above with reference to FIGS. 10 and 11.

For example, the fuel leak combustion assembly 222 further includes a plurality of fuel sensors 282 and a plurality of heat sources 224, each operable with one of the plurality of enclosures 294. The fuel leak combustion assembly 222 further includes a controller 284, with the controller 284 operably coupled to the fuel sensors 282 and heat sources 224 operable with the enclosures 294. In such a manner, the controller 284 may be configured to initiate an ignition of gaseous fuel leaking from one or more of the potential leak locations 218 (281A, 218B, 218C) within one or more of the enclosures 294 (294A, 294B, 294C).

Notably, for the embodiment depicted, each of the plurality of potential leak locations 218 (281A, 218B, 218C) is a joint of the gaseous fuel delivery section 216, and more specifically, is a joint between adjacent conduits 220 of the gaseous fuel delivery section 216.

However, as noted above, in other embodiments, one or more of the potential leak locations 218 (281A, 218B, 218C) may be locations along the gaseous fuel delivery section 216 other than joints.

Figure 13:
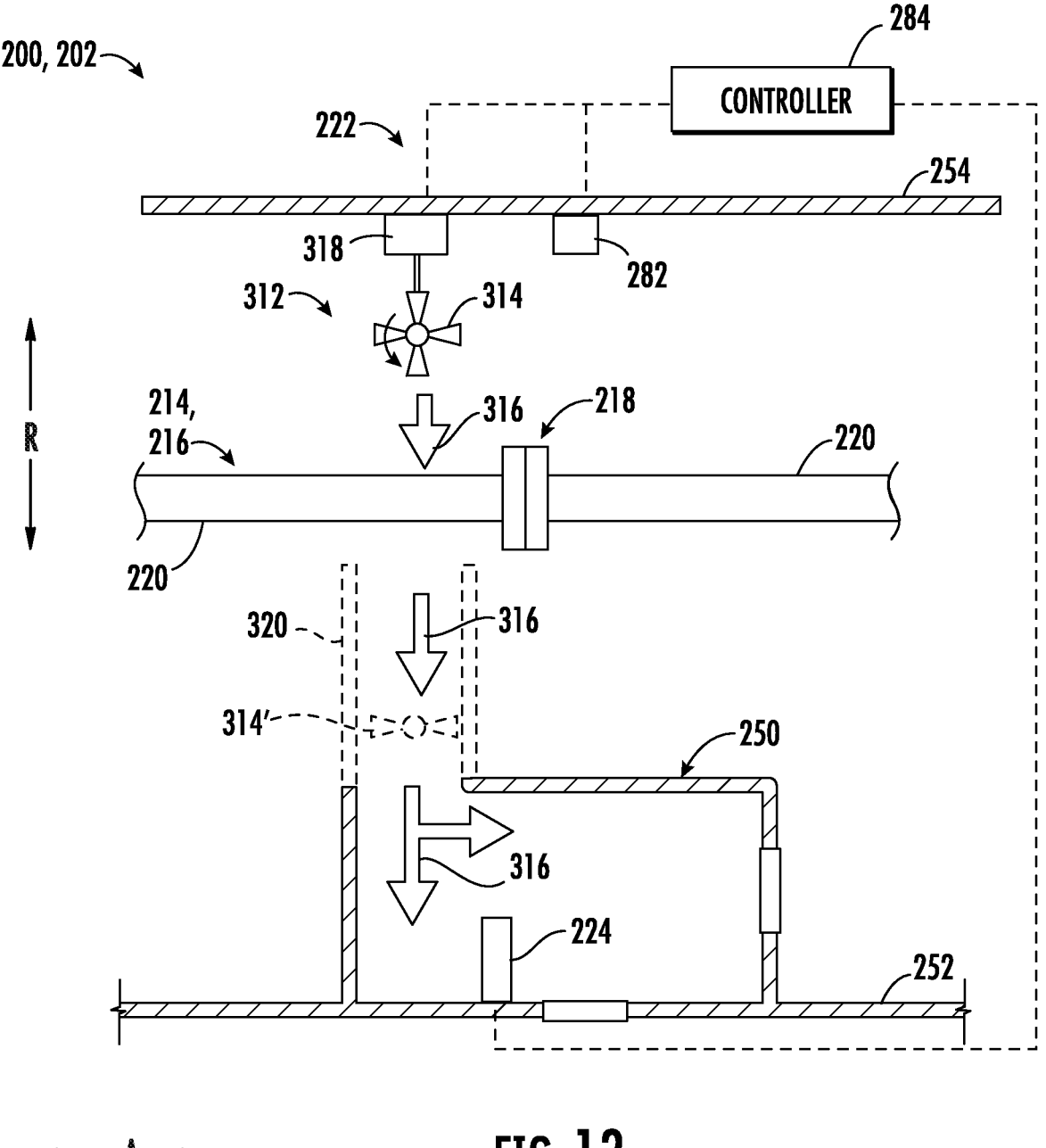
FIG. 13 is a schematic view of a fuel leak combustion assembly in accordance with still another exemplary embodiment of the present disclosure.

Referring now to FIG. 13, a fuel leak combustion assembly 222 in accordance with yet another exemplary embodiment of the present disclosure is provided. The exemplary fuel leak combustion assembly 222 of FIG. 13 may be configured in a similar manner as one or more the exemplary fuel leak combustion assembly 222 described hereinabove. Accordingly, the same or similar numbers may refer to the same or similar parts.

For example, the exemplary fuel leak combustion assembly 222 of FIG. 13 is operable with a gaseous fuel delivery section 216 of a fuel delivery assembly 214. The gaseous fuel delivery section 216 defines a potential leak location 218. The fuel leak combustion assembly 222 includes a heat source 224 positioned in communication with the potential leak location 218 to ignite a gaseous fuel leaking from the potential leak location 218 of the gaseous fuel delivery section 216 of the fuel delivery assembly 214.

However, for the embodiment depicted, an aeronautical vehicle including the fuel leak combustion assembly 222, and more specifically, a gas turbine engine 200 including the fuel leak combustion assembly 222, further includes a compartment 250 spaced from the potential leak location 218. The heat source 224 is positioned at least partially within the compartment 250, and the fuel leak combustion assembly 222 further includes a flow encouragement assembly 312. The heat source 224 is positioned in communication with the potential leak location 218 through the flow encouragement assembly 312 to ignite the gaseous fuel leaking from potential leak location 218 within the compartment 250.

In particular, for the embodiment depicted, the flow encouragement assembly 312 includes a fan 314 to urge gas surrounding the potential leak location 218 towards the compartment 250, as is indicated by flow arrows 316. The fan 314 includes a motor 318, which may be an electric motor 318. In the embodiment depicted, the fan 314 is located opposite the potential leak location 218 from the compartment 250 is configured to "push" gas into the compartment 250 when activated.

However, as is depicted in phantom, in other exemplary embodiments, the flow encouragement assembly 312 may include a fan 314' positioned on the same side of the potential leak location 218 as the compartment 250 to "pull" gas into the compartment 250. In particular, as is depicted in phantom, the compartment 250 may define an inlet duct 320, with the fan 314' located within the inlet duct 320 to pull gas into the compartment 250.

As with certain of the other exemplary embodiments, the exemplary fuel leak combustion assembly 222 of FIG. 13 further includes a fuel sensor 282 configured sense data indicative of a gaseous fuel leak from the potential leak location 218 (e.g., data indicative of a temperature, data indicative of a pressure, or both). The fuel leak combustion assembly 222 further includes a controller 284 operably coupled to the fuel sensor 282, the flow encouragement assembly 312, and the heat source 224. In response to obtaining data indicative of a gaseous fuel leak from the potential leak location 218, the controller 284 may be configured to activate the flow encouragement assembly 312 and simultaneously, or within a certain amount of time (e.g., less than 30 seconds), activate the heat source 224.

In certain exemplary embodiments, the controller 284 may keep the flow encouragement assembly 312 active for an amount of time in response to obtaining data indicative of the gaseous fuel leaking from the potential leak location 218. The amount of time may be a predetermined amount of time, or it may be determined in response to the data received by the fuel sensor 282 (pre-activation of the heat source 224, post activation of the heat source 224, or both).

Such a configuration may ensure the ignition of the gas leaking from the potential leak source is ignited at a safe location within the gas turbine engine 200 so as to avoid potential damage to certain components therein.

Notably, the compartment 250 of FIG. 13 includes a pressure relief assembly to accommodate the ignition. The pressure relief assembly is, in the embodiment shown a plurality of blow-out doors 258. However, in other embodiments, any other suitable pressure relief assembly may be provided.

Briefly, it will be appreciated that although the exemplary fuel leak combustion assemblies 222 described above are generally operable with a compartment within, or formed by, a gas turbine engine, in other exemplary embodiments, the fuel leak combustion assembly 222 may be operable with a compartment within the aeronautical vehicle containing the propulsion system having the gas turbine engine (see, e.g., compartment 23 in FIG. 1). Notably, with such a configuration, if a system is positioned within compartment, instead of the system being a gas turbine engine system, the system may be a vehicle system (see gas turbine engine system 278 in FIG. 3).

Figure 14:
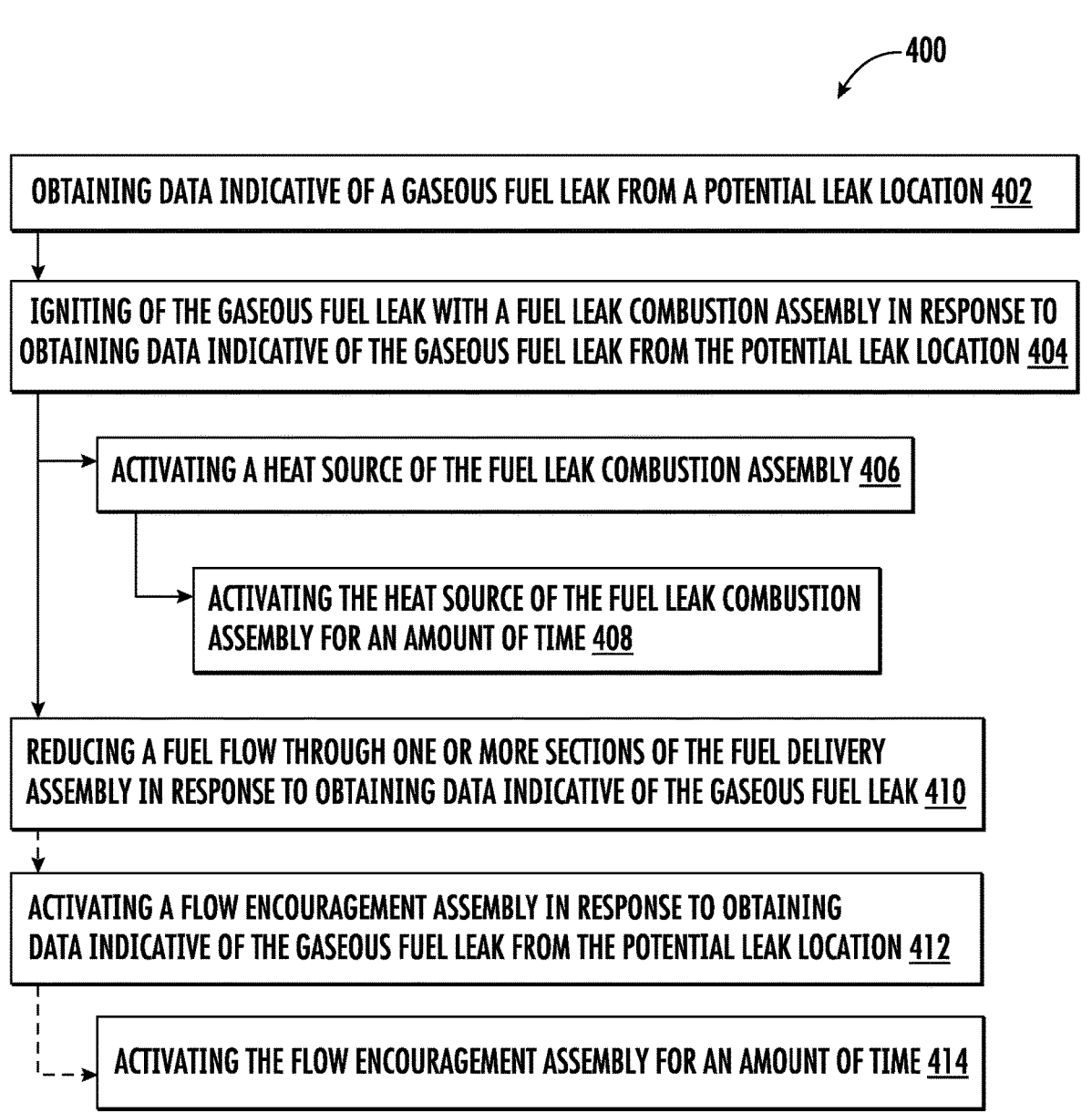
FIG. 14 is a flow diagram of a method of operating an aeronautical vehicle in accordance with an exemplary aspect of the present disclosure.

Referring now to FIG. 14, a flow diagram of a method 400 for operating an aeronautical vehicle in accordance with an exemplary aspect of the present disclosure is provided. The method 400 may be used with one or more of the exemplary embodiments described above with reference to FIGS. 1 through 13.

The method 400 includes at (402) obtaining data indicative of a gaseous fuel leak from a potential leak location. Obtaining the data at (402) may include obtaining data indicative of a pressure, data indicative of a temperature, or both, and further may include sensing data with a fuel sensor. For example, increases in pressure may indicate a gaseous fuel leak from the potential leak location, and decreases in temperature may indicate a gaseous fuel leak from the potential leak location.

The method 400 further includes at (404) igniting of the gaseous fuel leak with a fuel leak combustion assembly in response to obtaining data indicative of the gaseous fuel leak from the potential leak location. Obtaining data indicative of the gaseous fuel leak may include sensing data with a fuel sensor.

For the exemplary aspect depicted, igniting the gaseous fuel leak at (404) includes at (406) activating a heat source of the fuel leak combustion assembly. Activating the heat source of the fuel leak combustion assembly at (406) includes at (408) activating the heat source of the fuel leak combustion assembly for an amount of time.

The amount of time may be a predetermined amount of time (e.g., between 1 second and five minutes).

Alternatively, the amount of time may be an amount of time determined in response to data obtained from the fuel sensor. For example, the fuel sensor may continue to sense data indicative of temperature a pressure following the activation of the heat source at (408) and may keep the heat source active until the data indicates the risk from the fuel leak has subsided (e.g., a concentration of hydrogen gas has fallen below a predetermined level).

Referring still to FIG. 14, the method 400 further includes at (410) reducing a fuel flow through one or more sections of the fuel delivery assembly in response to obtaining data indicative of the gaseous fuel leak. Notably, reducing the fuel flow through one or more sections of the fuel delivery assembly at (410) may include a partial shut-off, or alternatively may include a complete shut-off (i.e., 0% fuel flow).

Moreover, the method 400 depicted may include at (412) activating a flow encouragement assembly in response to obtaining data indicative of the gaseous fuel leak from the potential leak location. For example, the heat source may be positioned in communication with the potential leak location through the flow encouragement assembly to ignite the gaseous fuel leaking from potential leak location within a compartment spaced from the potential leak location.

In certain exemplary aspects, activating the flow encouragement assembly at (412) may include at (414) activating the flow encouragement assembly for an amount of time. The amount of time may be a predetermined amount of time (e.g., between 1 second and five minutes).

Alternatively, the amount of time may be an amount of time determined in response to data obtained from the fuel sensor. For example, the fuel sensor may continue to sense data indicative of temperature a pressure following the activation of the flow encouragement assembly at (414) and may keep the flow encouragement assembly active until the data indicates the risk from the fuel leak has subsided (e.g., a concentration of hydrogen gas has fallen below a predetermined level).

Notably, although steps (412) and (414) are depicted as occurring after the ignition of the gaseous fuel leak at (404), in certain exemplary aspects, steps (412) and (414) may occur prior to ignition of the gaseous fuel leak at (404) to ensure the ignition takes place (see, e.g., FIG. 13).

It will be appreciated that while various aspects of the present disclosure are discussed with reference to use of hydrogen fuels, in other exemplary aspects of the present disclosure, other fuels may additionally or alternatively be used. For example, in other exemplary embodiments, aspects of this disclosure may be used with natural gas, ammonia, or the like.

Further aspects are provided by the subject matter of the following clauses:

An aeronautical vehicle comprising: a vehicle body; a propulsion system operable with the vehicle body, the propulsion system comprising a gas turbine engine, the gas turbine engine comprising a combustion section; a fuel delivery assembly comprising a gaseous fuel delivery section extending to the combustion section, the gaseous fuel delivery section defining a potential leak location; and a fuel leak combustion assembly comprising a heat source positioned in communication with potential leak location to ignite a gaseous fuel leaking from the potential leak location of the gaseous fuel delivery section of the fuel delivery assembly.

The aeronautical vehicle of any preceding clause, wherein the heat source comprises a burner, a mechanical spark generating device, an electrical spark generating device, a hot wire, a hot plate, or a combination thereof.

The aeronautical vehicle of any preceding clause, further comprising: a compartment, wherein the heat source is positioned in the compartment and wherein the potential leak location of the gaseous fuel delivery section is also located in the compartment.

The aeronautical vehicle of any preceding clause, wherein the compartment defines a diffusion zone surrounding the potential leak location, wherein the heat source is positioned in communication with the potential leak location by being positioned within the diffusion zone.

The aeronautical vehicle of any preceding clause, wherein the compartment is part of the gas turbine engine.

The aeronautical vehicle of any preceding clause, wherein the compartment is part of the vehicle body.

The aeronautical vehicle of any preceding clause, wherein the compartment comprises a blow-out door.

The aeronautical vehicle of any preceding clause, wherein the gaseous fuel is a hydrogen fuel.

The aeronautical vehicle of any preceding clause, wherein the vehicle body comprises a fuel tank, wherein the fuel delivery assembly extends from the fuel tank to the combustion section of the gas turbine engine.

The aeronautical vehicle of any preceding clause, wherein the fuel leak combustion assembly further comprises a fuel sensor configured to sense data indicative of gaseous fuel leaking from the potential leak location.

The aeronautical vehicle of any preceding clause, wherein the fuel leak combustion assembly further comprises a controller in operable communication with the fuel sensor and the heat source, and wherein in response to obtaining data indicative of gaseous fuel leaking from the potential leak location, the controller is configured to activate the heat source to ignite the gaseous fuel leaking from the potential leak location.

The aeronautical vehicle of any preceding clause, wherein the fuel leak combustion assembly further comprises a controller in operable communication with the fuel sensor and the fuel delivery assembly, and wherein in response to obtaining data indicative of gaseous fuel leaking from the potential leak location, the controller is configured to reduce a fuel flow through one or more sections of the fuel delivery assembly.

The aeronautical vehicle of any preceding clause, wherein the gaseous fuel delivery section comprises a first section in flow communication with the combustion section and a second section in flow communication with the combustion section, wherein the potential leak location is defined by the first section, and wherein in response to obtaining data indicative of gaseous fuel leaking from the potential leak location, the controller is configured to reduce the fuel flow through the first section of the gaseous fuel delivery section.

The aeronautical vehicle of any preceding clause, wherein the fuel sensor is configured to sense data indicative of a temperature, a pressure, or both.

The aeronautical vehicle of any preceding clause, wherein the fuel leak combustion assembly further comprises a flame arrestor positioned around the potential leak location and the heat source.

The aeronautical vehicle of any preceding clause, further comprising: a vehicle system; a gas turbine engine system; a compartment, wherein the heat source is positioned in the compartment, wherein the potential leak location of the gaseous fuel delivery section is located in the compartment, and wherein one of the vehicle system or the gas turbine engine system is located in the compartment; and a shield positioned within the compartment between the potential leak location and one of the vehicle system or the gas turbine engine system.

The aeronautical vehicle of any preceding clause, wherein the shield is a non-structural component.

The aeronautical vehicle of any preceding clause, wherein the fuel leak combustion assembly further comprises an enclosure surrounding the potential leak location.

The aeronautical vehicle of any preceding clause, wherein the heat source extends through or is integrated with the enclosure.

The aeronautical vehicle of any preceding clause, wherein the enclosure comprises a diffuser.

The aeronautical vehicle of any preceding clause, wherein the enclosure is a local encapsulation of the potential leak location.

The aeronautical vehicle of any preceding clause, wherein the potential leak location is a first potential leak location, wherein the gaseous fuel delivery section further defines a plurality of potential leak locations, and wherein the fuel leak combustion assembly further comprises a plurality of enclosures, with each enclosure surrounding a respective one of the plurality of potential leak locations.

The aeronautical vehicle of any preceding clause, wherein each of the plurality of leak locations is a joint in the gaseous fuel delivery section.

The aeronautical vehicle of any preceding clause, wherein the fuel leak combustion assembly further comprises a flow encouragement assembly, and wherein the aeronautical vehicle further comprises: a compartment spaced from the potential leak location, wherein the heat source is positioned in the compartment, and wherein the heat source positioned in communication with the potential leak location through the flow encouragement assembly to ignite the gaseous fuel leaking from the potential leak location of the gaseous fuel delivery section of the fuel delivery assembly.

The aeronautical vehicle of any preceding clause, wherein the flow encouragement assembly includes a fan to urge gas surrounding the potential leak location towards the compartment.

The aeronautical vehicle of any preceding clause, wherein the fuel leak combustion assembly further comprises: a fuel sensor configured to sense data indicative of the gaseous fuel leaking from the potential leak location; and a controller in operable communication with the fuel sensor and the flow encouragement assembly, wherein the control is configured to activate the flow encouragement assembly in response to obtaining data from the fuel sensor indicative of a gaseous fuel leak.

A fuel leak combustion assembly for an aeronautical vehicle, the aeronautical vehicle comprising a vehicle body, a gas turbine engine having a combustion section, and a fuel delivery assembly extending to the combustion section, the fuel leak combustion assembly comprising: a heat source configured to be positioned in communication with a potential leak location of a gaseous fuel delivery section of the fuel delivery assembly; and a controller in operable communication with the heat source configured to activate the heat source in response to obtaining data indicative of a gaseous fuel leak from the potential leak location to ignite a gaseous fuel leaking from the potential leak location of the gaseous fuel delivery section of the fuel delivery assembly.

The fuel leak combustion assembly of any preceding clause, further comprising: a fuel sensor configured to sense data indicative of gaseous fuel leaking from the potential leak location, the fuel sensor in operable communication with the controller.

A method of operating an aeronautical vehicle, the method comprising: obtaining data indicative of a gaseous fuel leak from a potential leak location; and igniting of the gaseous fuel leak with a fuel leak combustion assembly in response to obtaining data indicative of the gaseous fuel leak from the potential leak location.

The method of any preceding clause, wherein igniting the gaseous fuel leak comprises activating a heat source of the fuel leak combustion assembly.

The method of any preceding clause, wherein activating the heat source of the fuel leak combustion assembly comprises activating the heat source of the fuel leak combustion assembly for an amount of time.

The method of any preceding clause, wherein the amount of time is a predetermined amount of time.

The method of any preceding clause, wherein the amount of time is a determined in response to data obtained from a fuel sensor.

The method of any preceding clause, wherein obtaining data indicative of the gaseous fuel leak comprises sensing data with a fuel sensor.

The method of any preceding clause, wherein sensing data with the fuel sensor comprises sensing temperature data, sensing pressure data, or both.

The method of any preceding clause, further comprising: reducing a fuel flow through one or more sections of a fuel delivery assembly in response to obtaining data indicative of the gaseous fuel leak.

The method of any preceding clause, further comprising: activating a flow encouragement assembly in response to obtaining data indicative of the gaseous fuel leak from the potential leak location.

The method of any preceding clause, wherein activating the flow encouragement assembly comprises activating the flow encouragement assembly for an amount of time.

The method of any preceding clause, wherein the amount of time is a predetermined amount of time.

The method of any preceding clause, wherein the amount of time is a determined in response to data obtained from a fuel sensor.

A controller for an aeronautical vehicle, the controller comprising memory and one or more processors, the memory storing instructions that when executed by the one or more processors cause the one or more processors to: obtain data indicative of a gaseous fuel leak from a potential leak location; and ignite the gaseous fuel leak with a fuel leak combustion assembly in response to obtaining data indicative of the gaseous fuel leak from the potential leak location.

The controller of any proceeding clause, wherein the instructions include an aspect of a method of any preceding clause.

An aeronautical vehicle comprising: a vehicle body; a propulsion system operable with the vehicle body, the propulsion system comprising a gas turbine engine, the gas turbine engine comprising a combustion section; a fuel delivery assembly comprising a gaseous fuel delivery section extending to the combustion section, the gaseous fuel delivery section defining a potential leak location; and a fuel leak combustion assembly comprising a means for igniting a gaseous fuel leaking from the potential leak location of the gaseous fuel delivery section of the fuel delivery assembly.

The aeronautical vehicle of any preceding clause, wherein the means for igniting the gaseous fuel comprises a heat source of any preceding clause.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An aeronautical vehicle comprising:
a vehicle body;
a propulsion system operable with the vehicle body, the propulsion system comprising a gas turbine engine, the gas turbine engine comprising a combustion section;
a fuel delivery assembly comprising a gaseous fuel delivery section extending to the combustion section, the gaseous fuel delivery section defining a potential leak location;
a fuel leak combustion assembly comprising a heat source enclosed with and positioned in communication with the potential leak location to ignite a gaseous fuel leaking from the potential leak location of the gaseous fuel delivery section of the fuel delivery assembly; and
a flame arrestor positioned between the potential leak location and the heat source, wherein the flame arrestor is configured to absorb and dissipate heat from the heat source.

2. The aeronautical vehicle of claim 1, wherein the heat source comprises a burner, a mechanical spark generating device, an electrical spark generating device, a hot wire, a hot plate, or a combination thereof.

3. The aeronautical vehicle of claim 1, further comprising:
a compartment, wherein the heat source is positioned in the compartment and wherein the potential leak location of the gaseous fuel delivery section is also located in the compartment, wherein the compartment physically surrounds both the potential leak location and the heat source.

4. The aeronautical vehicle of claim 3, wherein the compartment defines a diffusion zone surrounding the potential leak location, wherein the heat source is positioned in communication with the potential leak location by being positioned within the diffusion zone.

5. The aeronautical vehicle of claim 3, wherein the compartment is part of the gas turbine engine.

6. The aeronautical vehicle of claim 3, wherein the compartment is part of the vehicle body.

7. The aeronautical vehicle of claim 3, wherein the compartment comprises a blow-out door.

8. The aeronautical vehicle of claim 1, wherein the gaseous fuel is a hydrogen fuel.

9. The aeronautical vehicle of claim 1, wherein the fuel leak combustion assembly further comprises a fuel sensor configured to sense data indicative of gaseous fuel leaking from the potential leak location.

10. The aeronautical vehicle of claim 9, wherein the fuel leak combustion assembly further comprises a controller in operable communication with the fuel sensor and the heat source, and wherein in response to obtaining data indicative of gaseous fuel leaking from the potential leak location, the controller is configured to activate the heat source to ignite the gaseous fuel leaking from the potential leak location.

11. The aeronautical vehicle of claim 9, wherein the fuel leak combustion assembly further comprises a controller in operable communication with the fuel sensor and the fuel delivery assembly, and wherein in response to obtaining data indicative of gaseous fuel leaking from the potential leak location, the controller is configured to reduce a fuel flow through one or more sections of the fuel delivery assembly.

12. The aeronautical vehicle of claim 11, wherein the gaseous fuel delivery section comprises a first section in flow communication with the combustion section and a second section in flow communication with the combustion section, wherein the potential leak location is defined by the first section, and wherein in response to obtaining data indicative of gaseous fuel leaking from the potential leak location, the controller is configured to reduce the fuel flow through the first section of the gaseous fuel delivery section.

13. The aeronautical vehicle of claim 1, wherein the fuel leak combustion assembly further comprises the flame arrestor positioned around the potential leak location and the heat source, wherein the flame arrestor is a mesh.

14. The aeronautical vehicle of claim 1, wherein the fuel leak combustion assembly further comprises an enclosure surrounding the potential leak location.

15. The aeronautical vehicle of claim 14, wherein the heat source extends through or is integrated with the enclosure.

16. The aeronautical vehicle of claim 14, wherein the enclosure comprises a diffuser.

17. The aeronautical vehicle of claim 1, wherein the fuel leak combustion assembly further comprises a flow encouragement assembly, and wherein the aeronautical vehicle further comprises:
a compartment spaced from the potential leak location, wherein the heat source is positioned in the compartment, and wherein the heat source positioned in communication with the potential leak location through the flow encouragement assembly to ignite the gaseous fuel leaking from the potential leak location of the gaseous fuel delivery section of the fuel delivery assembly.

18. The aeronautical vehicle of claim 17, wherein the flow encouragement assembly includes a fan to urge gas surrounding the potential leak location towards the compartment.

19. A fuel leak combustion assembly for an aeronautical vehicle, the aeronautical vehicle comprising a vehicle body, a gas turbine engine having a combustion section, and a fuel delivery assembly extending to the combustion section, the fuel leak combustion assembly comprising:
a heat source physically enclosed with and positioned in communication with a potential leak location of a gaseous fuel delivery section of the fuel delivery assembly; and
a controller in operable communication with the heat source configured to activate the heat source in response to obtaining data indicative of a gaseous fuel leak from the potential leak location to ignite a gaseous fuel leaking from the potential leak location of the gaseous fuel delivery section of the fuel delivery assembly; and a flame arrestor positioned between the potential leak location and the heat source, wherein the flame arrestor includes a perforated metal structure to dissipate heat from the heat source.

20. An aeronautical vehicle comprising:

a vehicle body;

a propulsion system operable with the vehicle body, the propulsion system comprising a gas turbine engine, the gas turbine engine comprising a combustion section;

a fuel delivery assembly comprising a gaseous fuel delivery section extending to the combustion section, the gaseous fuel delivery section defining a potential leak location; and a fuel leak combustion assembly comprising:

a compartment surrounding the potential leak location;

a heat source enclosed within the compartment and positioned in communication with the potential leak location to ignite a gaseous fuel leaking from the potential leak location of the gaseous fuel delivery section of the fuel delivery assembly; and a flame arrestor positioned within the compartment and positioned between the potential leak location and the heat source, wherein the flame arrestor is positioned entirely around the potential leak location, and wherein the flame arrestor includes a mesh configured to absorb and dissipate heat from the heat source.

* * * * *